United States Patent
Hu et al.

(10) Patent No.: US 10,008,952 B1
(45) Date of Patent: Jun. 26, 2018

(54) POWER CONVERSION SYSTEM WITH CONDITIONER CAPACITOR DISCHARGE APPARATUS

(71) Applicant: Rockwell Automation Technologies, Inc., Mayfield Heights, OH (US)

(72) Inventors: Jiangang Hu, Grafton, WI (US); Lixiang Wei, Mequon, WI (US); James A. Ulrich, Hartland, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days. days.

(21) Appl. No.: 15/389,670

(22) Filed: Dec. 23, 2016

(51) Int. Cl.
   *H02M 5/42* (2006.01)
   *H02J 7/00* (2006.01)
   *H02J 7/34* (2006.01)

(52) U.S. Cl.
   CPC ............. *H02M 5/42* (2013.01); *H02J 7/0063* (2013.01); *H02J 7/345* (2013.01); *H02J 2007/0067* (2013.01)

(58) Field of Classification Search
   CPC .......... H02M 5/42; H02M 5/45; H02M 5/458; H02M 5/4585; H02M 3/07; H02M 3/073; H02M 3/335; H02M 1/32; H02M 1/34; H02M 7/48; H02M 7/103; H02M 7/525; H02M 7/537; H02M 7/1227; H02M 7/5387; H02J 9/062; Y02B 70/1441; Y02B 70/1491; H05B 41/04; H05B 41/28; H05B 41/2881; H05B 41/3927; H01J 29/003; H01J 2299/0015; H01J 61/56; H01T 13/05

USPC ..... 363/34, 37, 56.01, 56.05, 57, 60, 96, 98, 363/131, 132; 315/85, 283, 307
See application file for complete search history.

(56) References Cited

U.S. PATENT DOCUMENTS

| | | | | |
|---|---|---|---|---|
| 7,158,393 | B2* | 1/2007 | Schneider | H02J 3/1842 363/34 |
| 8,154,890 | B2* | 4/2012 | Yasuda | H02M 1/36 363/34 |
| 2010/0060200 | A1* | 3/2010 | Newman, Jr. | H05B 41/2822 315/307 |
| 2011/0133664 | A1* | 6/2011 | Imam | H05B 41/2887 315/283 |
| 2014/0145615 | A1* | 5/2014 | Goscha | H05B 41/2806 315/85 |

* cited by examiner

*Primary Examiner* — Yemane Mehari
(74) *Attorney, Agent, or Firm* — Fay Sharpe LLP

(57) ABSTRACT

Power conversion systems, discharge circuits and methods are disclosed for discharging a DC bus conditioner capacitor connected between a neutral node and a first reference node in a DC bus circuit of a power conversion system, in which a DC bus voltage of the power conversion system is monitored, and a discharge control DC power supply is activated in response to the DC bus voltage transitioning below a first threshold voltage to activate a switching circuit to connect a discharge resistor between the first reference node and a DC bus terminal of the DC bus circuit to at least partially discharge the conditioner capacitor through the discharge resistor.

20 Claims, 6 Drawing Sheets

POWER CONVERSION SYSTEM WITH CONDITIONER CAPACITOR DISCHARGE APPARATUS

BACKGROUND INFORMATION

The subject matter disclosed herein relates to power conversion systems with conditioner capacitor discharge apparatus.

BRIEF DESCRIPTION

Disclosed examples include power conversion systems, discharge circuits and methods to discharge a DC bus conditioner capacitor connected between a neutral node and a first reference node in a DC bus circuit of a power conversion system. A monitor circuit monitors a DC bus voltage of the power conversion system, and the monitor circuit selectively activates a DC power supply in response to the DC bus voltage transitioning below a first threshold voltage to activate a switching circuit to connect a discharge resistor between the first reference node and a DC bus terminal of the DC bus circuit to at least partially discharge the terminals of the conditioner capacitor through the discharge resistor.

DETAILED DESCRIPTION

Figure 1:
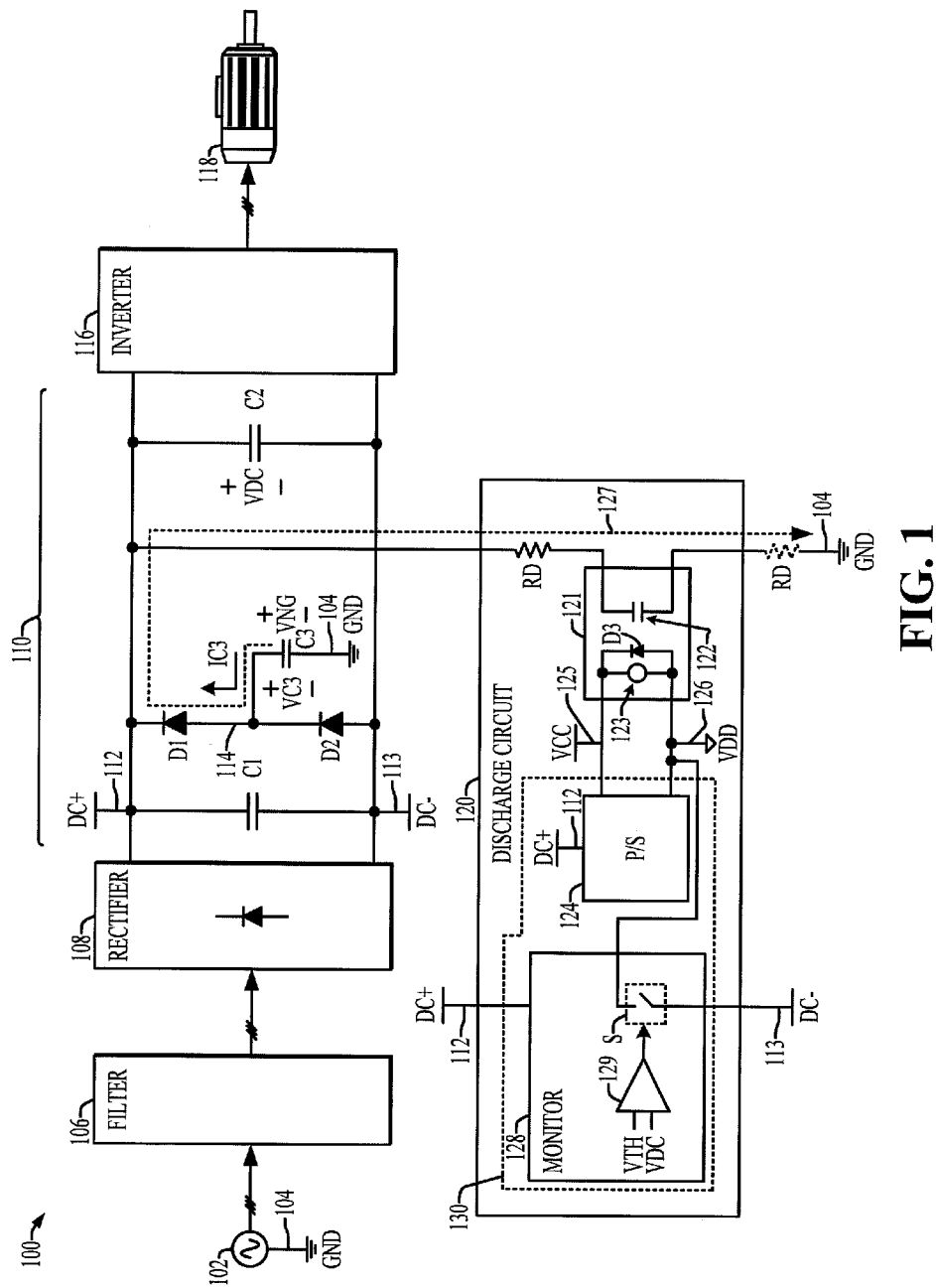
FIG. 1 is a schematic diagram of a power conversion system.

FIG. 1 illustrates a power conversion system 100 that receives AC input power from a single or multiphase power source 102 and provides AC output power to drive a motor load 118. The system 100 includes a rectifier 108 with an AC input to the receive AC input power from the source 102, and a DC output to provide a DC output signal to a DC bus circuit 110. In the illustrated example, a filter circuit 106 (e.g., single or multiphase LC or LCL filter circuit in certain examples) is connected between the phase lines of the input source 102 and the AC input of the rectifier circuit 108. In other possible implementations, the filter circuit 106 can be omitted. The AC input source 102 is referenced to a ground or other reference node 104 (indicated as GND in the drawings). The ground reference node 104 can be, for example, a neutral node of a Y-connected input source 102, where the source 102 can in certain examples include a transformer with a Y-connected primary or secondary including a neutral node to form the ground reference node 104 for the power conversion system 100. In certain examples, the reference node 104 is connected to a chassis (not shown) of the motor drive power converter 100. The power conversion system 100 also includes an output inverter 116 with a DC input that receives DC input power from the DC bus circuit 110, and a single or multiphase AC output to provide AC output power to drive a load 118.

The DC bus circuit 110 includes first and second DC bus terminals 112 and 113, respectively, and one or more DC bus capacitors (e.g., C1 and C2 in the illustrated example) connected between the bus terminals 112 and 113. In this example, the first DC bus terminal 112 provides a positive DC voltage (DC+) relative to the voltage (DC−) of the second DC bus node 113. The DC bus terminals 112 and 113 are individually coupled between the rectifier DC output and the inverter DC input. As shown in FIG. 1, the DC bus circuit 110 further includes a first diode D1 connected between a DC bus neutral node 114 and the first DC bus terminal 112, as well as a second diode D2 connected between the neutral node 114 and the second DC bus terminal 113. As the voltage DC+ of the first DC bus terminal 112 is positive relative to the voltage DC− of the second DC bus terminal 113, the diode D1 has an anode connected to the neutral node 114 and a cathode connected to the first DC bus terminal 112, while the anode of the second diode D2 is connected to the second DC bus terminal 113 and the cathode of D2 is connected to the neutral node 114.

In operation, the rectifier 108 provides a DC output voltage between the DC bus terminals 112 and 113 to provide a controlled DC bus voltage VDC at the DC input of the inverter 116. The rectifier 108 can be a passive rectifier circuit, or can be an active front and rectifier with a plurality of switching devices individually connected between the corresponding rectifier AC input terminals and a corresponding one of the DC bus terminals 112, 113. The inverter 116 includes a plurality of inverter switching devices (not shown) individually coupled between a corresponding one of the DC bus terminals 112, 113 and a corresponding one of the AC output lines. The inverter 116 selectively activates the inverter switching devices in order to convert DC input power from the DC bus circuit 110 to provide variable frequency, variable amplitude AC output voltages and corresponding currents to drive a motor load 118. Although illustrated and described in connection with a motor drive type system 100, the concepts of the present disclosure can be applied in other power conversion systems having a DC bus circuit with a conditioning capacitor.

A conditioner capacitor C3 is provided in the system 100 for conditioning the DC bus voltage VDC. The conditioner capacitor C3 includes a first terminal connected to the neutral node 114 and a second terminal connected to a first reference node 104 (e.g., the reference node 104 associated with the AC source 102 in this example). The conditioner capacitor C3 provides an AC connection between the neutral node 114 and the system ground reference node 104. In certain field applications, a transformer and/or output filter may be connected between the output of the inverter 116 and the driven motor load 118. In marine applications, such as motor drives to operate a submersible pump motor 118, the system 100 is operated as a floating grounded system, in which no discharge resistor can be permanently connected to the conditioner capacitor C3. As a result, high voltage may exist between the DC bus circuit 110 and the ground reference node 104 after the system is powered down. In the illustrated system, for example, when an input breaker (not shown) is opened to shut down the system 100, the DC bus capacitors C1 and C2 will discharge through connections to the motor load 118, whereas no closed circuit exists for discharging the conditioner capacitor C3. Due to the floating ground configuration, no dedicated discharge resistor is provided in the DC bus circuit 110 to discharge the capacitor C3, in order to maintain a low leakage system. Accordingly, the capacitor C3 can remain charged under certain pre-shutdown operating conditions, often to a significantly high voltage level, for a very long time after the system breaker is opened and the other capacitances have been discharged. For example, the conditioner capacitor C3 can retain a charge if a load side fault occurs and after the drive 100 is shut down and source and load side breakers and/or contactors are opened.

As seen in FIG. 1, the example power conversion system 100 also includes an automatic discharge circuit 120. The discharge circuit 120 discharges the terminals of the conditioner capacitor C3. In certain embodiments, the discharge circuit 120 can also discharge other common mode capacitors in the power conversion system 100, including parasitic common mode capacitances. The discharge circuit 120 in the illustrated example includes connections to the first and second DC bus terminals 112 and 113, as well as a connection to the chassis ground or reference node 104. The discharge circuit 120 includes a discharge resistor RD, a switching circuit 121, and a discharge control circuit 130 which includes a power supply circuit 124 and a monitor circuit 128. Any suitable switching circuit 121 can be used that is activated by a signal, such as a falling edge signal, to connect the discharge resistor RD between one of the DC bus nodes 112, 113 or AC input lines or other suitable discharge paths, and the reference node 104. In the illustrated example, the switching circuit 120 connects the discharge resistor RD between the positive DC bus node 112 and the reference node 104 in response to a signal from the monitor circuit 128. In the illustrated example, the discharge resistor RD is connected between a DC bus terminal (e.g., 112) and a contact 122 of the switching circuit. In other possible implementations, the discharge resistor can be connected between the contact 122 and the reference node 104, as shown in dashed line in FIG. 1. In various embodiments, the normally open contact 122 and the discharge resistor RD are coupled in series with one another to create a discharge path between the first and second terminals of the conditioner capacitor C3, which path may include other components (e.g., one or more diodes, etc.). The power supply 124 in one example is a step down switch mode power supply to selectively provide power to the switching circuit 121 for completing the discharge circuit. The monitor circuit 128 can be any suitable sensing circuitry to detect or sense powered down of the motor drive power conversion system 100, and in response, generate a signal to cause the switching circuit 121 to complete the discharge closed circuit. As seen in FIG. 1, the example switching circuit 121 includes a normally open contact 122 connected between the discharge resistor RD and the reference node 104.

As seen in FIG. 1, during normal operation, a neutral-ground voltage VNG can develop across the conditioner capacitor C3. When the monitor circuit 128 detects that the system 100 is being shutdown (e.g., via detecting the DC bus voltage VDC transitioning below a first threshold voltage level VTH1), the monitor circuit 128 activates the power supply circuit 124 to provide power to energize a relay coil 123 of the switching circuit 121, thereby closing the contact 122. This creates a discharge path 127 for discharge current IC3 to flow out of the conditioner capacitor C3, through the discharge resistor RD, and through the closed contact 122 to the ground reference node 104. This automatic operation of the discharge circuit 120 can be advantageously employed to fully or at least partially discharge the capacitance between high voltage structure to ground for marine applications or other floating ground configurations of the power conversion system 100.

The discharge resistor RD has a first terminal connected to the DC bus terminal 112 and a second terminal connected to the normally open contact 122 of the switching circuit 121. The other terminal of the contact 122 is connected to the reference node 104. The switching circuit 121 includes a control input formed by first and second control inputs or terminals connected to corresponding ends of the relay coil 123. In one example, a diode D3 is connected across the relay coil 123 as shown in FIG. 1. The discharge control circuit 130 selectively provides a control signal to the control input to cause the switching circuit 121 to close the switch contact 122 in response to the DC bus voltage VDC transitioning below a first threshold voltage VTH1 to at least partially discharge the conditioner capacitor C3 through the discharge resistor RD. In one example, for a nominal DC bus voltage of 1,000 V, the first threshold voltage VTH1 is approximately 180 V, although any other suitable first threshold level can be used in other embodiments.

Any suitable monitor circuit 128 can be used to monitor the DC bus voltage VDC during normal operation of the system 120. FIG. 1 schematically shows an example comparator circuit 129 that compares the voltage VDC to a threshold voltage signal VTH1. The comparator circuit 129 in this example turns on a switch S in response to the DC bus voltage VDC transitioning below VTH1. This connects a second reference node 126 to the negative DC bus terminal 113 (DC−). In this example, the second reference node 126 is a DC power supply reference terminal. With this terminal 126 connected to DC−, the DC power supply circuit 124 provides a DC voltage output signal VCC at a first (e.g., positive) output node 125 relative to the voltage VDD of the second reference node 126. In one example, the DC power supply circuit 124 has a power connection to the positive DC bus terminal 112 (DC+), and the output terminals 125, 126 of the supply circuit 124 are connected to the control input (e.g., coil 123) of the switching circuit 121. The monitor circuit 128 in this example selectively activates the DC power supply 124 to apply power to the switching circuit 121 to cause the switching circuit 121 to close the switch contact 122 in response to the DC bus voltage VDC transitioning below the first threshold voltage VTH1.

Figure 2:
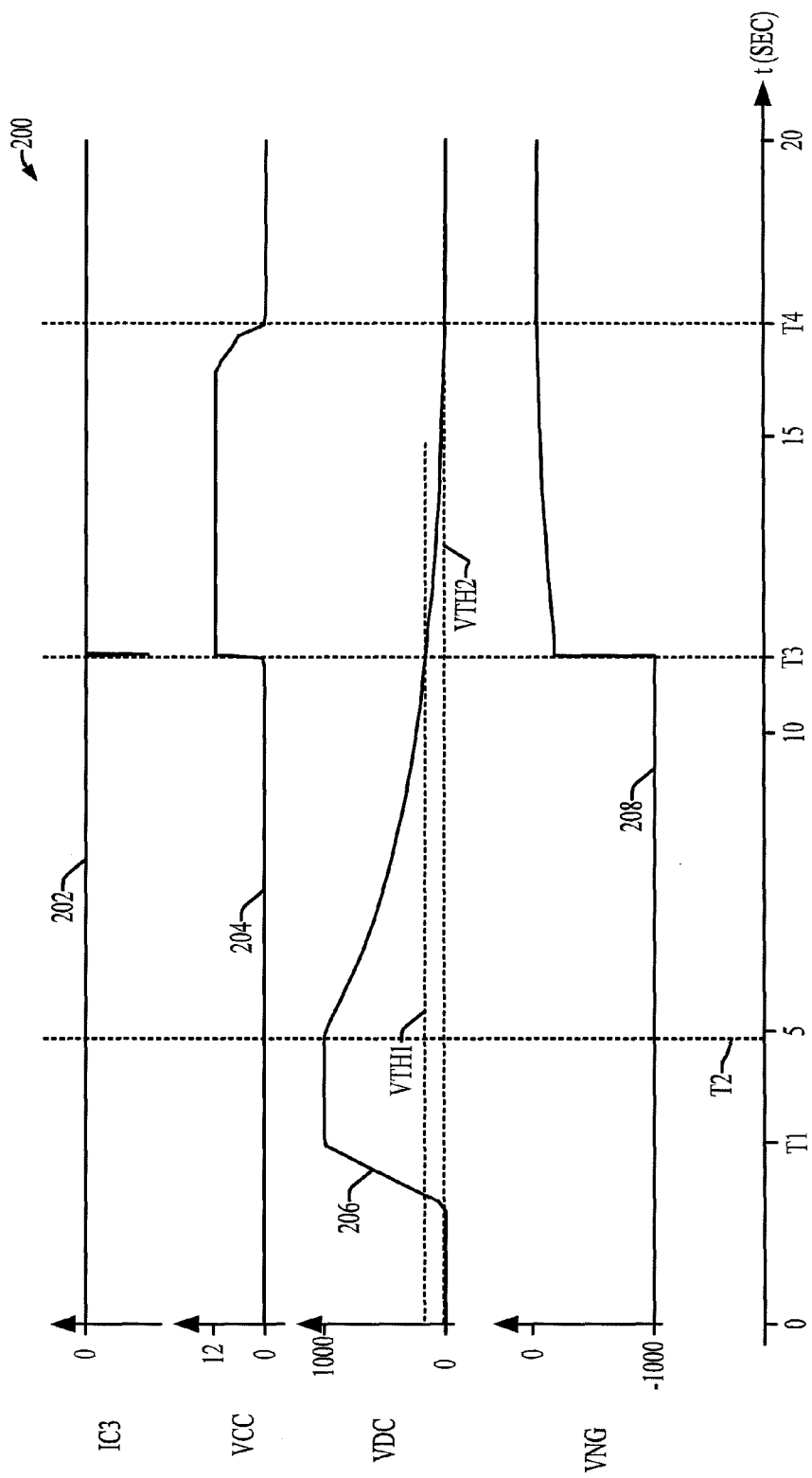
FIG. 2 is a waveform diagram of signals in the power conversion system of FIG. 1.

Referring also to FIG. 2, a waveform diagram graph 200 illustrates example signals in operation of the power conversion system 100 of FIG. 1. Waveform curve 202 illustrates the conditioner capacitor current IC3 flowing in the conditioner capacitor C3, curve 204 shows the power supply output voltage signal VCC (e.g., the voltage between the nodes 125 and 126, i.e. VCC-VDD), and the DC bus voltage VDC is shown as curve 206 for an example nominal DC bus voltage of 1000 V. Waveform curve 208 in FIG. 2 illustrates the neutral-ground voltage VNG (e.g., across the conditioner capacitor C3 in FIG. 1). The graph 200 in this example shows initial signals at power down, followed by startup of the system 100. The DC bus voltage curve 206 rises after a system circuit breaker is closed, through operation of the rectifier 108 and any associated pre-charging circuitry (not shown). At T1 in FIG. 2, the DC bus voltage reaches a steady-state value (e.g., 1000 V in this non-limiting example). During this steady-state normal operation, the conditioner capacitor current curve 202 is essentially zero, and the power supply circuit 124 is off (curve 204 is zero). In addition, in one example, the neutral-ground voltage curve 208 is approximately −1000 V during steady state operation.

At time T2 in the graph 200, the system circuit breaker is opened, and the DC bus voltage curve 206 begins to decrease toward zero. During this transition after the start of system shutdown, the DC bus capacitor C1 and C2 discharge, while the conditioner capacitor C3 has no discharge path and thus retains its voltage VNG (curve 208) at approximately −1000 V. The monitor circuit 128 monitors the DC bus voltage VDC, and detects transition of the bus voltage below a first threshold voltage VTH1 (e.g., 180 V) at T3 in the example of FIG. 2. In response to this detection, the monitor circuit 128 connects the second reference node 126 to the negative DC bus terminal 113 (DC−), which causes activation of the power supply circuit 124. The power supply circuit 124 provides a non-zero DC output voltage signal (e.g., 24 V) between the circuit nodes 125 and 126 in response to the signal from the monitor circuit 128 following time T3, shown as a rise in the curve 204 from approximately 12 V in the illustrated example. This energizes the relay coil 123 of the switching circuit 121, resulting in closure of the relay contact 122 at or shortly after time T3 in FIG. 2.

With the contact 122 closed, a discharge path 127 is established for discharging the conditioner capacitor C3, causing a negative spike in the conditioner capacitor current IC3 shown in curve 202 in FIG. 2 following T3. The discharge circuit 120 thus quickly discharges the conditioner capacitor C3 in response to transition of the DC bus voltage VDC below the first threshold voltage VTH1. As seen in the curve 208 in FIG. 2, moreover, discharging of the conditioner capacitor C3 quickly reduces the neutral-ground voltage VNG, which transitions quickly from −1000 V to near zero following T3. In this example, the power supply circuit 124 continues to provide approximately 12 V output to the relay coil (curve 204) after time T3, and the power supply circuit 124 begins to turn off prior to time T4 in response to the DC bus voltage VDC (curve 206) transitioning below a lower second threshold voltage VTH2. In this manner, the DC power supply 124 discontinues the supply voltage VCC-VDD between the first and second DC output nodes 125, 126 when the second reference node 126 is disconnected from the second DC bus terminal 113. As seen in the example of FIGS. 1 and 2, the discharge circuit 120 advantageously discharges the conditioner capacitor C3 in automatic fashion based on monitoring of the DC bus voltage VDC. This allows timely access by service personnel with the DC bus capacitors C1, C2 and the conditioner capacitor C3 discharge to a safe level.

Figure 3:
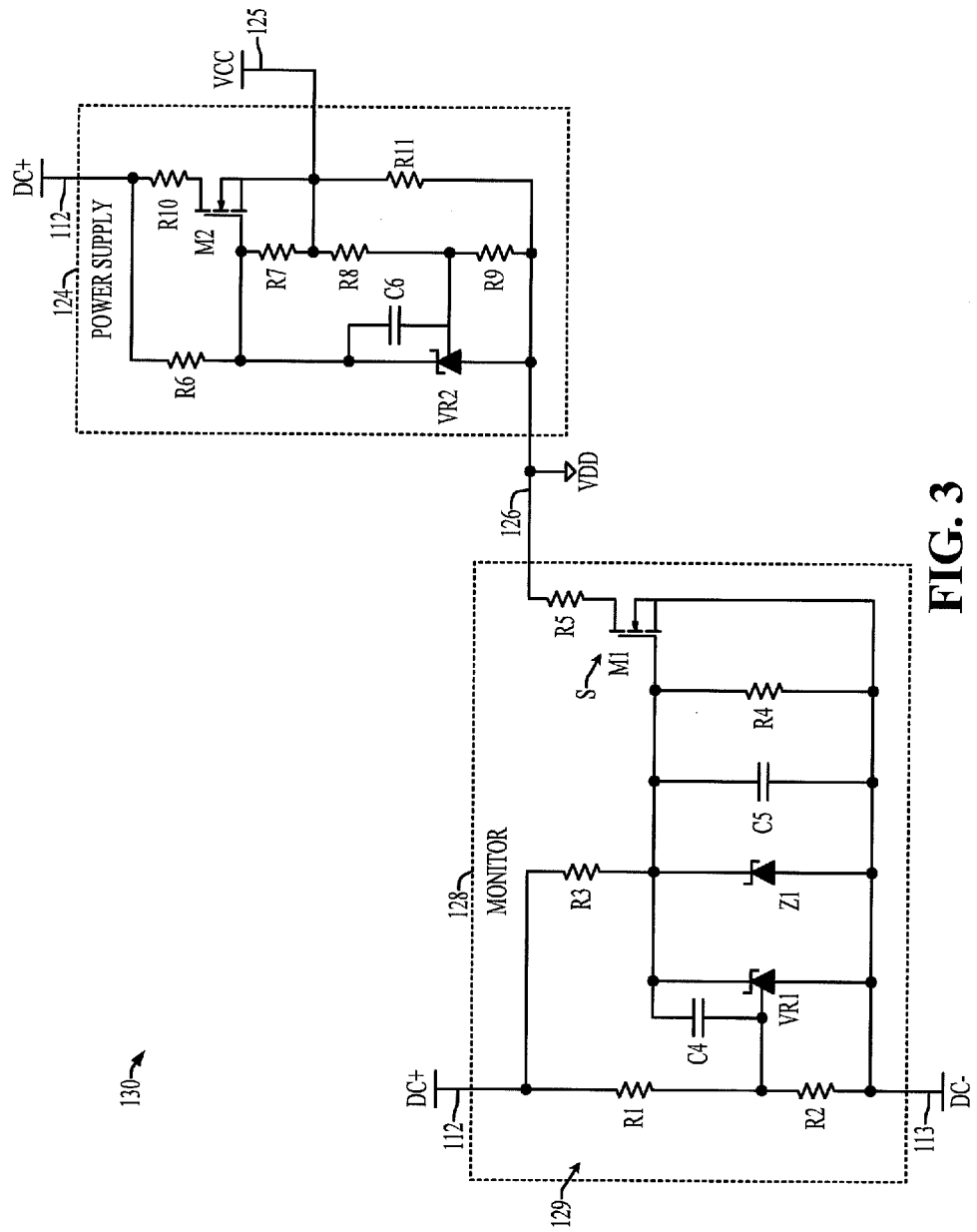
FIG. 3 is a schematic diagram of a monitor circuit and a power supply circuit and the power conversion system of FIG. 1.

FIG. 3 is a schematic diagram of an example monitor circuit 128 and a power supply circuit 124 which can be employed in the power conversion system of FIG. 1. The monitor circuit 128 selectively connects the second DC output node 126 of the DC power supply 124 to the second DC bus terminal 113 to activate the DC power supply 124 in response to the DC bus voltage VDC transitioning below the first threshold voltage VTH1. In addition, the monitor circuit 128 thereafter disconnects the second DC output node 126 from the second DC bus terminal 113 in response to the DC bus voltage VDC transitioning below the second threshold voltage VTH2. In the illustrated example, the monitor circuit 128 deactivates the power supply 124 by disconnecting the second DC output node 126 from the second DC bus terminal 113 in response to the DC bus voltage VDC transitioning below VTH2.

In the example of FIG. 3, the monitor circuit 128 includes a resistive divider circuit formed by resistors R1 and R2 connected in series with one another between the DC bus terminals 112 and 113. The divider circuit R1, R2 provides a control voltage signal to a control terminal of a first voltage regulator VR1 (e.g., a TL431 adjustable precision shunt relator or programmable reference in one example). The regulator VR1 in one example provides a 2.5 V reference between its anode and cathode to deliver a gate control voltage to an NMOS switch S (M1) relative to the negative DC bus terminal 113. The switch S includes a source connected to the DC bus terminal 113, and a drain connected through a resistor R5 to the second reference node 126 (VDD). A third resistor R3 is connected between the positive DC bus terminal 112 and the gate of the switch S. A capacitor C4 is connected between the control terminal of the voltage reference component VR1 and the gate of the switch S. In addition, a 12-17 V Zener diode Z1 is connected in parallel with a further capacitor C5 and a resistor R4 between the switch gate node and the negative DC bus terminal 113 as shown in FIG. 3. The regulator VR1 controls the gate voltage The power supply circuit example 124 in FIG. 3 provides a 12 V output between the circuit nodes 125 and 126 (VCC) when activated by connection of the second reference node 126 to the second DC bus terminal 113 by the monitor circuit 128. The power supply 124 includes a second voltage regulator VR2, such as a TL431 adjustable precision shunt relator or programmable reference. The regulator VR2 includes a control terminal connected to a resistive divider formed by resistors R8 and R9 to provide a control signal representing the output voltage VCC at the node 125 relative to the second reference node 126 (VCC relative to VDD). A capacitor C6 is connected between the control terminal and the anode of the regulator VR2, and the cathode of the regulator VR2 is connected to the reference node 126. The anode of the regulator VR2 is connected through a resistor R6 to the positive DC bus terminal 112. A second NMOS transistor M2 includes a drain connected to the positive DC bus terminal 112 by a resistor R10, a gate connected to the anode of the regulator VR2, and a source connected to the output node 125. A further resistor R7 is connected from gate to source of the transistor M2, and a resistor R11 connects the output node 125 to the second reference node 126. In operation, once the reference node 126 is connected by the monitor circuit 128 to the negative DC bus terminal 113, the regulator VR2 receives current from the positive DC bus node 112 through the resistor R6, and operates to provide a controlled gate-to-source voltage across the resistor R7 to operate the transistor M2 in linear mode. The regulator VR2 receives a feedback signal from the resistive divider circuit R8 and R9, and provides closed loop regulation of the output voltage VCC at the output node 125 based on the control signal from the resistive divider.

As seen in FIG. 3, when the switch S (M1) of the monitor circuit 128 is turned off, no current flows from the positive DC bus terminal 112 through the power supply circuit 124, and the power supply 124 is deactivated or turned off. In this state, the power supply 124 does not provide an output voltage between the nodes 125 and 126. As a result, the switching circuit coil 123 (FIG. 1) is not energized, and the normally close contact 122 is open. This is the state during normal operation of the power conversion system 100. When the system 100 is shut down (e.g., by opening a system circuit breaker, not shown), the DC bus capacitors C1 and C2 in FIG. 1 begin to discharge and the DC bus voltage VDC is reduced as shown in the curve 206 in FIG. 2. The monitor circuit 128 detects transition of the DC bus voltage VDC below a first threshold voltage (VTH1 in FIG. 2) set by the ratio of the divider resistors R1 and R2 in FIG. 3. In one example, the first threshold VTH1 is set to approximately 180 V for a nominal DC bus voltage level of 1000 V. Different thresholds can be set for different implementations, for example, by changing the ratio of R1 and R2 in the monitor circuit 128 of FIG. 3.

Once the threshold has been passed, the voltage regular VR1 of the monitor circuit turns on the monitor circuit switch S by providing a suitable gate voltage to the transistor M1. This connects the reference node 126 to the negative DC bus terminal 113 via the resistor R5, and activates the power supply 124. The power supply 124, in turn, begins providing a non-zero DC bus voltage VDC (e.g., 12 V in one example) by providing closed-loop feedback to deliver a suitable gate voltage to the transistor M2 in order to regulate the power supply output voltage between the nodes 125 and 126. This operation is shown after T3 in FIG. 2. The initial powering of the supply output energizes the relay coil 123 to close the contact 122. As discussed above, this discharges (completely or at least partially) the conditioner capacitor C3 along the current path 127 in FIG. 1. The power supply 124 continues supplying an output voltage until the DC bus voltage drops to a sufficiently low second threshold value VTH2, for example, approximately equal to or less than the regulated power supply output voltage (e.g., less than or equal to 12 V in one example). Once the DC bus voltage VDC drops below the second threshold VTH2, the power supply 124 becomes deactivated, for example, by the monitor circuit 128 disconnecting the reference node 126 from the negative DC bus terminal 113 and/or by the power supply circuit (FIG. 3) having insufficient voltage overhead to regulate the output voltage at the node 125 at the nominal level.

As previously mentioned, the circuitry 128, 124 operates to automatically activate the switching circuit 121 in order to provide automatic discharging of the conditioner capacitor C3. This, in turn, facilitates safe access to components of the power conversion system 100 after shutdown, as the conditioner capacitor C3 has been discharged, completely or at least partially without requiring actions by an operator or maintenance personnel.

Figure 4:
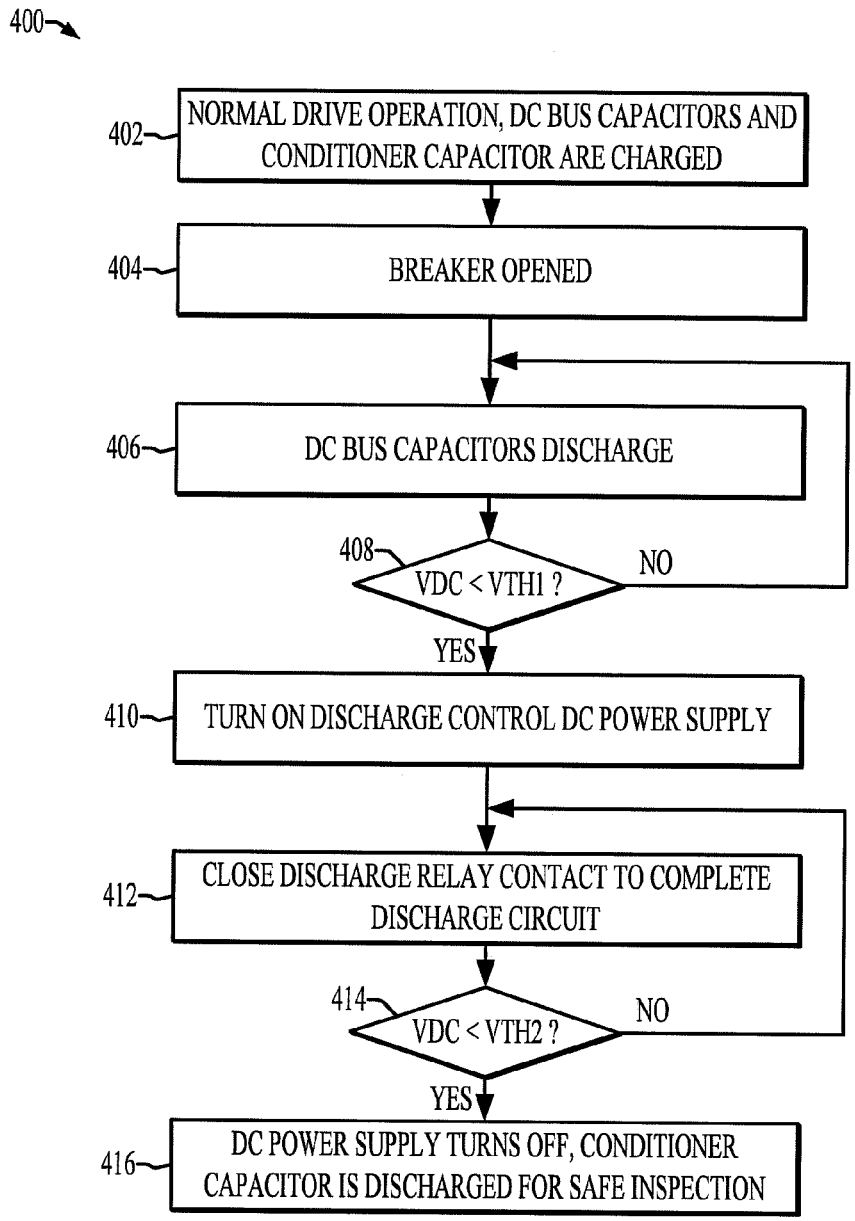
FIG. 4 is a flow diagram of a method for discharging a DC bus conditioner capacitor.

FIG. 4 provides a method 400 to discharge a conditioner capacitor C3 connected between a neutral node 114 and a first reference node 104 in a DC bus circuit 110 of a power conversion system 100. The illustrated method can be implemented in association with any suitable power conversion system, such as the system 100 illustrated and described above. The method 400 begins at 402 in normal drive operation (e.g., between T1 and T2 in FIG. 2). The DC bus voltage VDC in one implementation is at or near the rated nominal level, and may be regulated to a desired nominal value by operation of the rectifier 108 in FIG. 1. At 404 in FIG. 4, a system shutdown begins, such as by opening a main circuit breaker (e.g., at T2 in FIG. 2). At 406 and FIG. 4, the DC bus capacitors begin discharging, for example, shown by the decreasing DC bus voltage VDC in the curve 206 of FIG. 2 after T2. At 408, and the DC bus voltage VDC of the DC bus circuit 110 is monitored, for example, using a monitor circuit 128 as previously described. If the DC bus voltage is at or above a first threshold level VTH1 (NO at 408 in FIG. 4), the DC bus capacitors continue to discharge at 406. If the monitor circuit 128 determines that the DC bus voltage has transitioned below the first threshold voltage VTH1 (YES at 408 in FIG. 4), the process 400 proceeds to 410 for the monitor circuit 128 in the illustrated example connects the reference node 126 to the negative DC bus terminal 113 or otherwise provides a signal to turn on the DC power supply 124. At 412, the switching circuit 121 closes the normally open relay contact 122 in response to the power supply energizing the relay coil 123. In this manner the switching circuit 121 connects the discharge resistor RD between the first reference node 104 and the positive DC bus terminal 112 to provide a closed circuit discharge path 127 to at least partially discharge the conditioner capacitor C3 through the discharge resistor RD. A determination is made at 414 in FIG. 4 as to whether the DC bus voltage VDC has transitioned below a second (lower) threshold VTH2 through further discharging of the DC bus capacitors C1 and C2 in FIG. 1. If not (NO at 414), the power supply 124 continues operation. Once the DC bus voltage VDC transitions below VTH2 (YES at 414), the DC power supply 124 turns off at 416. At this point, the DC bus capacitors C1, C2 and the conditioner capacitor C3 are discharged for safe inspection and access by operators or service personnel. The process 400 thus facilitates automatic identification of power conversion system power down information (e.g., DC bus voltage level VDC) and discharge bus conditioner capacitors, and in response automatically discharges the conditioner capacitor C3. The disclosed examples thus provide a simplified bus conditioner cap discharge process compared with manual discharge methods. Moreover, the presently disclosed examples find particular utility in marine applications or other situations in which a dedicated discharge resistor is undesirable, while facilitating safety goals in motor drives and other power conversion systems.

Figure 5:
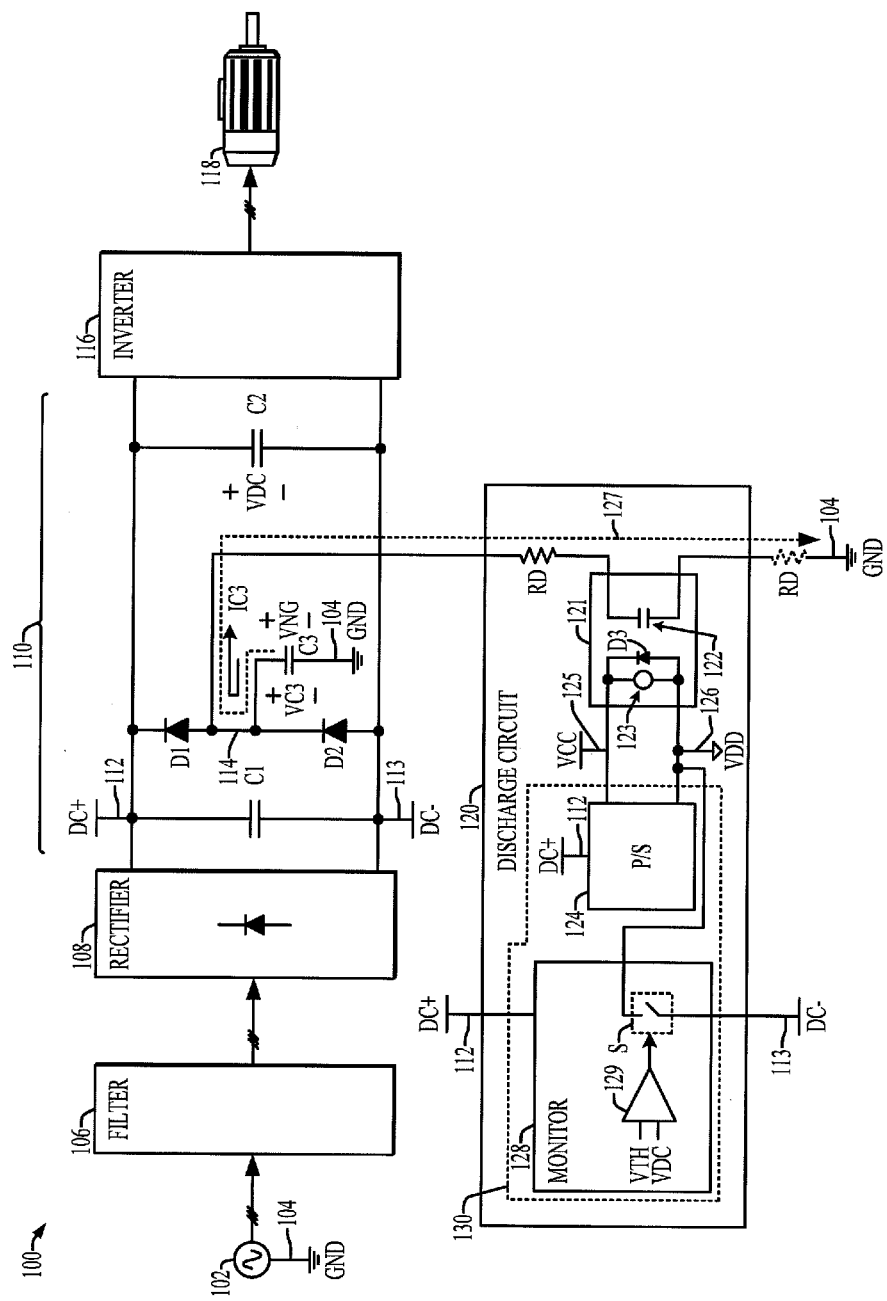
FIG. 5 is a schematic diagram of another example power conversion system.

FIG. 5 illustrates another non-limiting example power conversion system 100 generally as described above. In this example, the discharge circuit 120 includes a discharge resistor RD as well as a switching circuit 121 as previously described. In this case, however, the upper terminal of the discharge resistor RD is connected directly to the upper terminal of the conditioner capacitor C3. In operation as described above, when the power supply 124 is activated, the switching circuit coil 123 is energized causing the contact 122 to close. This provides a discharge path 127 to conduct discharge current IC3 from the conditioner capacitor C3, creating a closed discharge circuit including the discharge resistor RD, the contact 122, and the first and second terminals of the conditioner capacitor C3.

Figure 6:
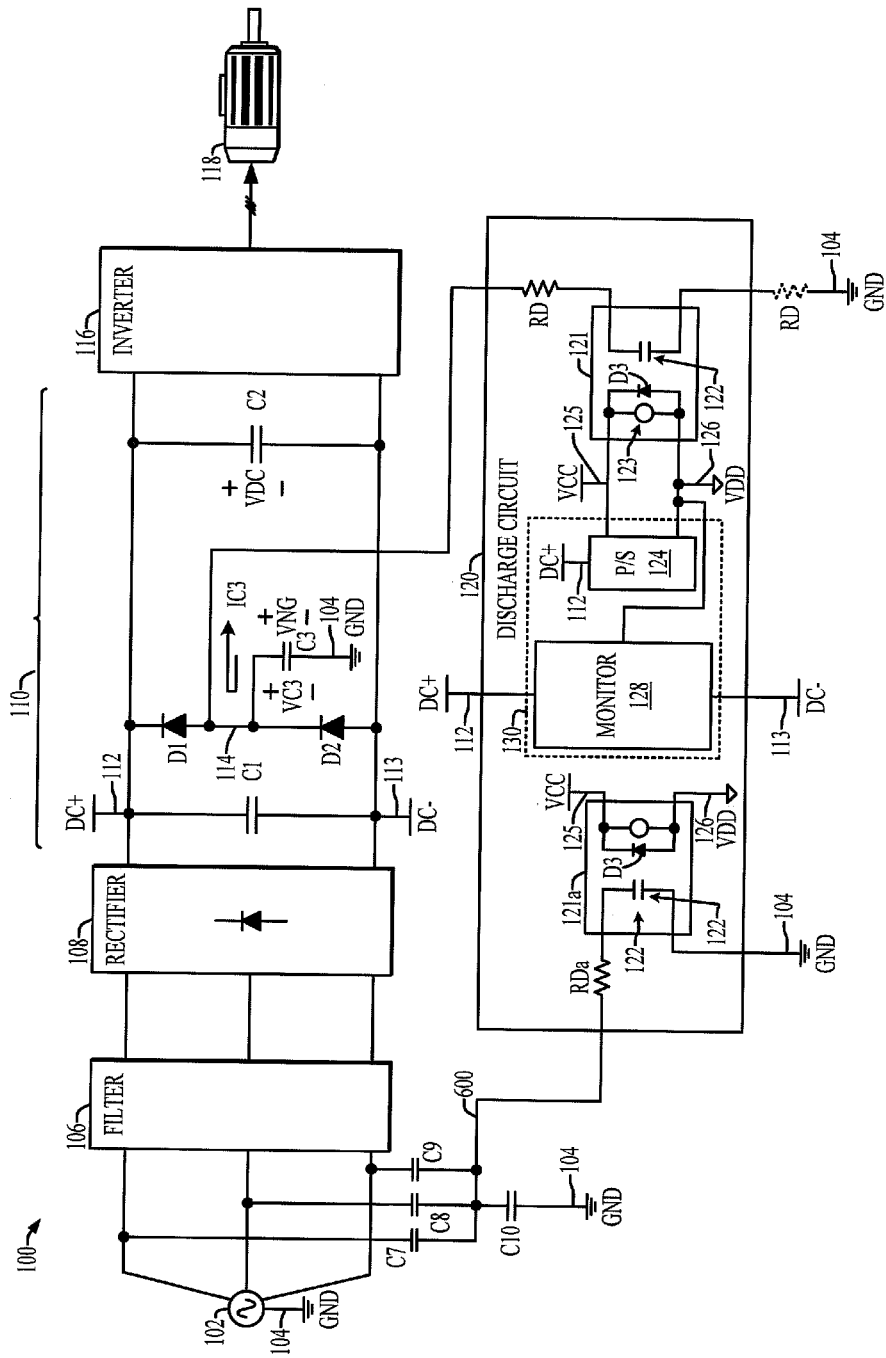
FIG. 6 is a schematic diagram of another example power conversion system.

FIG. 6 illustrates a further non-limiting example, in which the discharge circuitry 120 includes a first switching circuit 121 as described above, as well as a second switching circuit (e.g., a relay) 121a and a corresponding second discharge resistor RDa. The second relay 121a also includes a coil 122 connected between the output terminals 125 and 126 (VCC and VDD) of the power supply circuit 124. When the power supply circuit 124 is activated, the contact 122 of the second relay switching circuit 121a is closed. The power conversion system 100 in this example includes a common mode AC filter circuit including capacitors C7, C8 and C9, individually connected to a corresponding one of three AC input lines, and the capacitors C7-C9 are connected in a "Y" configuration. A common mode capacitor C10 is coupled between the common connection point or node 600 of the filter capacitors C7-C9 and the chassis ground reference node 104. In this embodiment, the contact 122 of the second relay 121a and the discharge resistor RDa are connected in series between the terminals of the capacitor C10 (e.g., directly or indirectly). In this configuration, the power supply circuit 124 is activated by the monitor circuit 130 when the DC bus voltage VDC transitions below the first threshold voltage VTH1, causing the coil 122 of the second relay 121a to close, and discharge the capacitors C7-C10. Other embodiments are possible including one or more switching circuits 121 operated by the discharge control circuit 130 to selectively discharge one or more common mode capacitors in the system 100.

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense. Also, the terms "couple", "couples", or "coupled" are intended to include indirect or direct electrical or mechanical connection or combinations thereof. For example, if a first device couples to or is coupled with a second device, that connection may be through a direct electrical connection, or through an indirect electrical connection via one or more intervening devices and connections.

The following is claimed:

1. A power conversion system, comprising:
   a rectifier, including an AC input to receive AC input power, and a DC output with first and second DC output terminals to provide a DC output signal;
   an inverter, including a DC input with first and second DC input terminals to receive DC input power, and an AC output to provide AC output power to drive a load;
   a DC bus circuit, including a first DC bus terminal connected to the first DC output terminal and to the first DC input terminal and a second DC bus terminal connected to the second DC output terminal and to the first DC input terminal, at least one DC bus capacitor with a first terminal connected to the first DC bus terminal and a second terminal connected to the second DC bus terminal, a first diode connected between a neutral node and the first DC bus terminal, and a second diode connected between the neutral node and the second DC bus terminal;
   a conditioner capacitor, including a first terminal connected to the neutral node, and a second terminal connected to a first reference node; and
   a discharge circuit to discharge the conditioner capacitor, the discharge apparatus comprising: a discharge resistor, a switching circuit including a control input and a normally open switch contact coupled in series with the discharge resistor between the first and second terminals of the conditioner capacitor, and a discharge control circuit configured to selectively provide a control signal to the control input of the switching circuit to cause the switching circuit to close the switch contact in response to a DC bus voltage between the first and second DC bus terminals of the DC bus circuit transitioning below a first threshold voltage to at least partially discharge the conditioner capacitor through the discharge resistor.

2. The power conversion system of claim 1, wherein the discharge control circuit comprises:
   a DC power supply, including an output connected to the control input of the switching circuit; and
   a monitor circuit configured to selectively activate the DC power supply to apply power to the switching circuit to cause the switching circuit to close the switch contact in response to the DC bus voltage transitioning below the first threshold voltage.

3. The power conversion system of claim 2, wherein the switching circuit includes a relay, comprising:
   the normally open switch contact coupled between the second terminal of the discharge resistor and the first reference node, and
   a relay coil, including a first terminal connected to a first control input of the switching circuit, and a second terminal connected to a second control input of the switching circuit.

4. The power conversion system of claim 3, wherein the DC power supply includes:
   an input connected to the first DC bus terminal;
   a first DC output node connected to the first terminal of the relay coil; and
   a second DC output node connected to the second terminal of the relay coil and to a second reference node;
   wherein the DC power supply is operative when the second reference node is coupled with the second DC bus terminal to provide a supply voltage between the first and second DC output nodes to energize the relay coil to close the normally open switch contact.

5. The power conversion system of claim 4, wherein the DC power supply discontinues the supply voltage between the first and second DC output nodes when the second reference node is disconnected from the second DC bus terminal.

6. The power conversion system of claim 5, wherein the monitor circuit is configured to selectively connect the second DC output node of the DC power supply to the second DC bus terminal to activate the DC power supply in response to the DC bus voltage transitioning below the first threshold voltage, and to thereafter disconnect the second DC output node from the second DC bus terminal in response to the DC bus voltage transitioning below a second threshold voltage, the first threshold voltage being greater than the second threshold voltage.

7. The power conversion system of claim 5, wherein the monitor circuit is configured to selectively connect the second DC output node of the DC power supply to the second DC bus terminal to activate the DC power supply in response to the DC bus voltage transitioning below the first threshold voltage.

8. The power conversion system of claim 2,
   wherein the DC power supply includes an input connected to the first DC bus terminal, a first DC output node connected to a first control input of the switching circuit, and a second DC output node connected to a second control input of the switching circuit;
   wherein the DC power supply is operative when the second DC output node is coupled with the second DC bus terminal to provide a supply voltage between the first and second DC output nodes to cause the switching circuit to close the switch contact; and
   wherein the DC power supply discontinues the supply voltage between the first and second DC output nodes when the second DC output node is disconnected from the second DC bus terminal.

9. The power conversion system of claim 8, wherein the monitor circuit is configured to selectively connect the second DC output node to the second DC bus terminal to activate the DC power supply in response to the DC bus voltage transitioning below the first threshold voltage, and to thereafter disconnect the second DC output node from the second DC bus terminal in response to the DC bus voltage transitioning below a second threshold voltage, the first threshold voltage being greater than the second threshold voltage.

10. The power conversion system of claim 2, further comprising:
    a filter circuit, including a plurality of filter capacitors coupled with a common connection node;
    a second discharge resistor; and a second switching circuit including a control input and a normally open second switch contact coupled in series with the second discharge resistor between the common connection node and a terminal of one of the plurality of filter capacitors, the control input of the second switching circuit receiving the control input from the discharge control circuit to selectively close the second switch contact in response to the DC bus voltage transitioning below the first threshold voltage to at least partially discharge the filter capacitors.

11. A discharge circuit for discharging a conditioner capacitor connected between a neutral node and a first reference node in a power conversion system, the discharge circuit comprising:
a discharge resistor;
a switching circuit, including a control input and a normally open switch contact coupled in series with the discharge resistor across the conditioner capacitor; and
a discharge control circuit configured to selectively provide a control signal to the control input of the switching circuit to cause the switching circuit to close the switch contact in response to a DC bus voltage between first and second DC bus terminals of the DC bus circuit transitioning below a first threshold voltage to at least partially discharge the conditioner capacitor through the discharge resistor.

12. The discharge circuit of claim 11, wherein the discharge control circuit comprises:
a DC power supply, including an output connected to the control input of the switching circuit; and
a monitor circuit configured to selectively activate the DC power supply to apply power to the switching circuit to cause the switching circuit to close the switch contact in response to the DC bus voltage transitioning below the first threshold voltage.

13. The discharge circuit of claim 12, wherein the switching circuit includes a relay, comprising:
the normally open switch contact coupled in series with the discharge resistor between the first reference node and the DC bus terminal or the AC input terminal, and
a relay coil, including a first terminal connected to a first control input of the switching circuit, and a second terminal connected to a second control input of the switching circuit.

14. The discharge circuit of claim 13, wherein the DC power supply includes:
an input connected to the first DC bus terminal;
a first DC output node connected to the first terminal of the relay coil; and
a second DC output node connected to the second terminal of the relay coil and to a second reference node;
wherein the DC power supply is operative when the second reference node is coupled with the second DC bus terminal to provide a supply voltage between the first and second DC output nodes to energize the relay coil to close the normally open switch contact.

15. The discharge circuit of claim 14, wherein the DC power supply discontinues the supply voltage between the first and second DC output nodes when the second reference node is disconnected from the second DC bus terminal.

16. The discharge circuit of claim 13, wherein the monitor circuit is configured to selectively connect the second DC output node of the DC power supply to the second DC bus terminal to activate the DC power supply in response to the DC bus voltage transitioning below the first threshold voltage.

17. The discharge circuit of claim 12,
wherein the DC power supply includes an input connected to the first DC bus terminal, a first DC output node connected to a first control input of the switching circuit, and a second DC output node connected to a second control input of the switching circuit;
wherein the DC power supply is operative when the second DC output node is coupled with the second DC bus terminal to provide a supply voltage between the first and second DC output nodes to cause the switching circuit to close the switch contact; and
wherein the DC power supply discontinues the supply voltage between the first and second DC output nodes when the second DC output node is disconnected from the second DC bus terminal.

18. The discharge circuit of claim 17, wherein the monitor circuit is configured to selectively connect the second DC output node to the second DC bus terminal to activate the DC power supply in response to the DC bus voltage transitioning below the first threshold voltage, and to thereafter disconnect the second DC output node from the second DC bus terminal in response to the DC bus voltage transitioning below a second threshold voltage, the first threshold voltage being greater than the second threshold voltage.

19. The discharge circuit of claim 12, wherein the monitor circuit is configured to selectively activate the DC power supply in response to the DC bus voltage transitioning below the first threshold voltage, and to thereafter deactivate the DC power supply in response to the DC bus voltage transitioning below a second threshold voltage, the first threshold voltage being greater than the second threshold voltage.

20. A method to discharge a conditioner capacitor connected between a neutral node and a first reference node in a DC bus circuit of a power conversion system, the method comprising:
monitoring a DC bus voltage of a DC bus circuit of a power conversion system;
turning on a discharge control DC power supply in response to the DC bus voltage transitioning below a first threshold voltage to activate a switching circuit to connect a discharge resistor between the first reference node and a DC bus terminal of the DC bus circuit to at least partially discharge the conditioner capacitor through the discharge resistor.

* * * * *